US008806219B2

(12) United States Patent
Relyea et al.

(10) Patent No.: US 8,806,219 B2
(45) Date of Patent: Aug. 12, 2014

(54) TIME-BASED FUNCTION BACK-OFF

(75) Inventors: Robert Relyea, Mountain View, CA (US); Robert B. Lord, Mountain View, CA (US); Steven William Parkinson, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 1021 days.

(21) Appl. No.: 11/466,691

(22) Filed: Aug. 23, 2006

(65) Prior Publication Data
US 2008/0072283 A1 Mar. 20, 2008

(51) Int. Cl.
*G06F 21/00* (2013.01)
*G06F 21/31* (2013.01)
*H04L 29/06* (2006.01)

(52) U.S. Cl.
CPC ............ *H04L 63/0853* (2013.01); *G06F 21/31* (2013.01)
USPC ............................... 713/182; 726/2; 713/189

(58) Field of Classification Search
USPC ................. 713/182–186; 235/380; 726/2–21, 726/27–30
See application file for complete search history.

(56) References Cited

U.S. PATENT DOCUMENTS

| 4,108,367 | A | * | 8/1978 | Hannan ......................... 235/457 |
| 4,849,614 | A |   | 7/1989 | Watanabe et al. |
| 4,924,330 | A |   | 5/1990 | Seamons et al. |
| 5,247,163 | A | * | 9/1993 | Ohno et al. .................... 235/492 |
| 5,355,414 | A | * | 10/1994 | Hale et al. ....................... 726/34 |
| 5,499,371 | A |   | 3/1996 | Henninger et al. |
| 5,594,227 | A | * | 1/1997 | Deo .............................. 235/380 |
| 5,631,961 | A |   | 5/1997 | Mills et al. |
| 5,666,415 | A |   | 9/1997 | Kaufman |
| 5,721,781 | A |   | 2/1998 | Deo et al. |
| 5,745,576 | A |   | 4/1998 | Abraham et al. |
| 5,745,678 | A |   | 4/1998 | Herzberg et al. |
| 5,768,373 | A |   | 6/1998 | Lohstroh et al. |
| 5,862,310 | A |   | 1/1999 | Crawford et al. |
| 5,923,884 | A |   | 7/1999 | Peyret et al. |
| 5,937,066 | A |   | 8/1999 | Gennaro et al. |
| 5,943,423 | A | * | 8/1999 | Muftic ............................ 705/67 |
| 5,991,411 | A |   | 11/1999 | Kaufman et al. |
| 5,991,882 | A |   | 11/1999 | O'Connell |
| 6,005,942 | A |   | 12/1999 | Chan et al. |
| 6,005,945 | A |   | 12/1999 | Whitehouse |

(Continued)

FOREIGN PATENT DOCUMENTS

| WO | WO 9724831 | * | 7/1997 | ................ H04L 9/08 |
| WO | 0048064 A1 |   | 8/2000 | |
| WO | 2007096590 A1 |   | 8/2007 | |

OTHER PUBLICATIONS

Wong et al, A Dynamic User Authentication Scheme for Wireless Sensor Networks, 2006, IEEE.*

(Continued)

*Primary Examiner* — Bradley Holder
*Assistant Examiner* — Brian Olion
(74) *Attorney, Agent, or Firm* — Lowenstein Sandler LLP

(57) ABSTRACT

An embodiment generally relates to a method of increasing user convenience. The method includes displaying a log-in user interface and receiving an authentication attempt in the log-in user interface. The method also includes determining a status of the authentication attempt and delaying a completion of an authentication attempt by a time-based function in response to a status being a failed authentication attempt.

26 Claims, 4 Drawing Sheets

(56) References Cited

U.S. PATENT DOCUMENTS

| | | | |
|---|---|---|---|
| 6,011,847 A | 1/2000 | Follendore, III | |
| 6,016,476 A | 1/2000 | Maes et al. | |
| 6,044,155 A | 3/2000 | Thomlinson et al. | |
| 6,072,876 A | 6/2000 | Obata et al. | |
| 6,141,420 A | 10/2000 | Vanstone et al. | |
| 6,178,507 B1 | 1/2001 | Vanstone | |
| 6,179,205 B1 | 1/2001 | Sloan | |
| 6,226,744 B1 | 5/2001 | Murphy et al. | |
| 6,377,825 B1* | 4/2002 | Kennedy et al. | 455/569.2 |
| 6,490,680 B1 | 12/2002 | Scheidt et al. | |
| 6,502,108 B1 | 12/2002 | Day et al. | |
| 6,539,093 B1 | 3/2003 | Asad et al. | |
| 6,636,975 B1 | 10/2003 | Khidekel et al. | |
| 6,643,701 B1 | 11/2003 | Aziz et al. | |
| 6,687,190 B2 | 2/2004 | Momich et al. | |
| 6,691,137 B1 | 2/2004 | Kishi | |
| 6,698,654 B1 | 3/2004 | Zuppicich | |
| 6,734,886 B1 | 5/2004 | Hagan et al. | |
| 6,760,752 B1 | 7/2004 | Liu et al. | |
| 6,804,687 B2 | 10/2004 | Sampson | |
| 6,819,766 B1 | 11/2004 | Weidong | |
| 6,826,686 B1 | 11/2004 | Peyravian | |
| 6,829,712 B1 | 12/2004 | Madoukh | |
| 6,880,037 B2 | 4/2005 | Boyer | |
| 6,880,084 B1 | 4/2005 | Brittenham et al. | |
| 6,898,605 B2 | 5/2005 | Constantino | |
| 6,898,714 B1 | 5/2005 | Nadalin et al. | |
| 6,931,133 B2 | 8/2005 | Andrews et al. | |
| 6,941,326 B2 | 9/2005 | Kadyk et al. | |
| 6,970,970 B2 | 11/2005 | Jung et al. | |
| 6,978,933 B2 | 12/2005 | Yap et al. | |
| 6,986,040 B1 | 1/2006 | Kramer et al. | |
| 7,007,105 B1 | 2/2006 | Sullivan et al. | |
| 7,010,600 B1 | 3/2006 | Prasad et al. | |
| 7,050,589 B2 | 5/2006 | Kwan | |
| 7,051,213 B1 | 5/2006 | Kobayashi et al. | |
| 7,085,386 B2 | 8/2006 | Audebert et al. | |
| 7,114,028 B1 | 9/2006 | Green et al. | |
| 7,156,302 B2 | 1/2007 | Yap et al. | |
| 7,159,763 B2 | 1/2007 | Yap et al. | |
| 7,185,018 B2 | 2/2007 | Archbold et al. | |
| 7,251,728 B2 | 7/2007 | Toh et al. | |
| 7,278,581 B2 | 10/2007 | Ong | |
| 7,299,364 B2 | 11/2007 | Noble et al. | |
| 7,302,585 B1 | 11/2007 | Proudler et al. | |
| 7,356,688 B1 | 4/2008 | Wang | |
| 7,374,099 B2 | 5/2008 | de Jong | |
| 7,386,705 B2 | 6/2008 | Low et al. | |
| 7,437,757 B2 | 10/2008 | Holdsworth | |
| 7,451,921 B2 | 11/2008 | Dowling et al. | |
| 7,475,250 B2 | 1/2009 | Aull et al. | |
| 7,475,256 B2 | 1/2009 | Cook | |
| 7,480,384 B2 | 1/2009 | Peyravian et al. | |
| 7,502,793 B2 | 3/2009 | Snible et al. | |
| 7,571,321 B2 | 8/2009 | Appenzeller et al. | |
| 7,602,910 B2 | 10/2009 | Johansson et al. | |
| 7,702,917 B2 | 4/2010 | Tevosyan et al. | |
| 7,769,996 B2 | 8/2010 | Randle et al. | |
| 7,822,209 B2 | 10/2010 | Fu et al. | |
| 7,860,243 B2 | 12/2010 | Zheng et al. | |
| 2001/0008012 A1 | 7/2001 | Kausik | |
| 2001/0036276 A1 | 11/2001 | Ober et al. | |
| 2001/0054148 A1 | 12/2001 | Hoornaert et al. | |
| 2002/0004816 A1 | 1/2002 | Vange et al. | |
| 2002/0007351 A1 | 1/2002 | Hillegass et al. | |
| 2002/0007359 A1 | 1/2002 | Nguyen | |
| 2002/0010679 A1 | 1/2002 | Felsher | |
| 2002/0029343 A1 | 3/2002 | Kurita | |
| 2002/0056044 A1 | 5/2002 | Andersson | |
| 2002/0059144 A1 | 5/2002 | Meffert et al. | |
| 2002/0064095 A1 | 5/2002 | Momich et al. | |
| 2002/0078350 A1* | 6/2002 | Sandhu et al. | 713/168 |
| 2002/0080958 A1 | 6/2002 | Ober et al. | |
| 2002/0099727 A1 | 7/2002 | Kadyk et al. | |
| 2002/0112156 A1 | 8/2002 | Gien et al. | |
| 2002/0120842 A1 | 8/2002 | Bragstad et al. | |
| 2002/0133707 A1 | 9/2002 | Newcombe | |
| 2002/0171546 A1 | 11/2002 | Evans et al. | |
| 2002/0184149 A1 | 12/2002 | Jones | |
| 2002/0188848 A1 | 12/2002 | Buttiker | |
| 2003/0005291 A1 | 1/2003 | Burn | |
| 2003/0012386 A1 | 1/2003 | Kim et al. | |
| 2003/0028664 A1 | 2/2003 | Tan et al. | |
| 2003/0035548 A1 | 2/2003 | Kwan | |
| 2003/0056099 A1 | 3/2003 | Asanoma et al. | |
| 2003/0075610 A1 | 4/2003 | Ong | |
| 2003/0093695 A1 | 5/2003 | Dutta | |
| 2003/0115455 A1 | 6/2003 | Aull et al. | |
| 2003/0115466 A1 | 6/2003 | Aull et al. | |
| 2003/0115467 A1 | 6/2003 | Aull et al. | |
| 2003/0115468 A1 | 6/2003 | Aull et al. | |
| 2003/0167399 A1 | 9/2003 | Audebert et al. | |
| 2003/0172034 A1 | 9/2003 | Schneck et al. | |
| 2004/0042620 A1 | 3/2004 | Andrews et al. | |
| 2004/0053642 A1 | 3/2004 | Sandberg et al. | |
| 2004/0066274 A1 | 4/2004 | Bailey | |
| 2004/0088562 A1 | 5/2004 | Vassilev et al. | |
| 2004/0096055 A1 | 5/2004 | Williams et al. | |
| 2004/0103324 A1 | 5/2004 | Band | |
| 2004/0103325 A1 | 5/2004 | Priebatsch | |
| 2004/0120525 A1 | 6/2004 | Miskimmin et al. | |
| 2004/0144840 A1 | 7/2004 | Lee et al. | |
| 2004/0146163 A1 | 7/2004 | Asokan et al. | |
| 2004/0153451 A1 | 8/2004 | Phillips et al. | |
| 2004/0162786 A1 | 8/2004 | Cross et al. | |
| 2004/0230831 A1 | 11/2004 | Spelman et al. | |
| 2005/0022123 A1 | 1/2005 | Constantino | |
| 2005/0033703 A1 | 2/2005 | Holdsworth | |
| 2005/0109841 A1 | 5/2005 | Ryan et al. | |
| 2005/0114673 A1* | 5/2005 | Raikar et al. | 713/182 |
| 2005/0119978 A1 | 6/2005 | Ates | |
| 2005/0123142 A1 | 6/2005 | Freeman et al. | |
| 2005/0138386 A1 | 6/2005 | Le Saint | |
| 2005/0138390 A1 | 6/2005 | Adams et al. | |
| 2005/0144312 A1 | 6/2005 | Kadyk et al. | |
| 2005/0144446 A1* | 6/2005 | Kishimoto | 713/168 |
| 2005/0184163 A1 | 8/2005 | de Jong | |
| 2005/0184164 A1 | 8/2005 | de Jong | |
| 2005/0184165 A1 | 8/2005 | de Jong | |
| 2005/0188360 A1 | 8/2005 | de Jong | |
| 2005/0216732 A1 | 9/2005 | Kipnis et al. | |
| 2005/0262361 A1 | 11/2005 | Thibadeau | |
| 2005/0279827 A1 | 12/2005 | Mascavage et al. | |
| 2005/0289652 A1 | 12/2005 | Sharma et al. | |
| 2006/0005028 A1 | 1/2006 | Labaton | |
| 2006/0010325 A1 | 1/2006 | Liu et al. | |
| 2006/0015933 A1 | 1/2006 | Ballinger et al. | |
| 2006/0036868 A1 | 2/2006 | Cicchitto | |
| 2006/0043164 A1 | 3/2006 | Dowling et al. | |
| 2006/0072747 A1 | 4/2006 | Wood et al. | |
| 2006/0073812 A1 | 4/2006 | Punaganti Venkata et al. | |
| 2006/0075133 A1 | 4/2006 | Kakivaya et al. | |
| 2006/0075486 A1 | 4/2006 | Lin et al. | |
| 2006/0101111 A1 | 5/2006 | Bouse et al. | |
| 2006/0101506 A1 | 5/2006 | Gallo et al. | |
| 2006/0173848 A1 | 8/2006 | Peterson et al. | |
| 2006/0174104 A1 | 8/2006 | Crichton et al. | |
| 2006/0206932 A1 | 9/2006 | Chong | |
| 2006/0208066 A1 | 9/2006 | Finn et al. | |
| 2006/0226243 A1 | 10/2006 | Dariel | |
| 2006/0291664 A1 | 12/2006 | Suarez et al. | |
| 2006/0294583 A1 | 12/2006 | Cowburn et al. | |
| 2007/0005985 A1* | 1/2007 | Eldar et al. | 713/183 |
| 2007/0014416 A1 | 1/2007 | Rivera et al. | |
| 2007/0056022 A1* | 3/2007 | Dvir | 726/4 |
| 2007/0074034 A1 | 3/2007 | Adams et al. | |
| 2007/0112721 A1 | 5/2007 | Archbold et al. | |
| 2007/0113267 A1 | 5/2007 | Iwanski et al. | |
| 2007/0113271 A1 | 5/2007 | Pleunis | |
| 2007/0118891 A1 | 5/2007 | Buer | |
| 2007/0162967 A1 | 7/2007 | de Jong et al. | |
| 2007/0169084 A1 | 7/2007 | Frank et al. | |
| 2007/0189534 A1 | 8/2007 | Wood et al. | |
| 2007/0204333 A1 | 8/2007 | Lear et al. | |

(56) References Cited

U.S. PATENT DOCUMENTS

| | | |
|---|---|---|
| 2007/0230706 A1 | 10/2007 | Youn |
| 2007/0271601 A1 | 11/2007 | Pomerantz |
| 2007/0277032 A1 | 11/2007 | Relyea |
| 2007/0280483 A1 | 12/2007 | Fu |
| 2007/0282881 A1 | 12/2007 | Relyea |
| 2007/0283163 A1 | 12/2007 | Relyea |
| 2007/0283427 A1 | 12/2007 | Gupta et al. |
| 2007/0288745 A1 | 12/2007 | Kwan |
| 2007/0288747 A1 | 12/2007 | Kwan |
| 2008/0005339 A1 | 1/2008 | Kwan |
| 2008/0019526 A1 | 1/2008 | Fu |
| 2008/0022086 A1 | 1/2008 | Ho |
| 2008/0022088 A1 | 1/2008 | Fu et al. |
| 2008/0022121 A1 | 1/2008 | Fu et al. |
| 2008/0022122 A1 | 1/2008 | Parkinson et al. |
| 2008/0022128 A1 | 1/2008 | Proudler et al. |
| 2008/0034216 A1 | 2/2008 | Law |
| 2008/0046982 A1 | 2/2008 | Parkinson |
| 2008/0056496 A1 | 3/2008 | Parkinson |
| 2008/0059790 A1 | 3/2008 | Parkinson |
| 2008/0059793 A1 | 3/2008 | Lord et al. |
| 2008/0069338 A1 | 3/2008 | Relyea |
| 2008/0069341 A1 | 3/2008 | Relyea |
| 2008/0077794 A1 | 3/2008 | Arnold et al. |
| 2008/0077803 A1 | 3/2008 | Leach et al. |
| 2008/0133514 A1 | 6/2008 | Relyea |
| 2008/0148047 A1 | 6/2008 | Appenzeller et al. |
| 2008/0189543 A1 | 8/2008 | Parkinson |
| 2008/0209224 A1 | 8/2008 | Lord |
| 2008/0209225 A1 | 8/2008 | Lord |
| 2008/0229401 A1 | 9/2008 | Magne |
| 2009/0003608 A1 | 1/2009 | Lee et al. |
| 2009/0133107 A1 | 5/2009 | Thoursie |
| 2010/0313027 A1 | 12/2010 | Taylor |

OTHER PUBLICATIONS

Selimis et al, Software and Hardware Issues in Smart Card Technology,2009, IEEE, 143-152.*

ATM and Credit Card Notification, Feb. 2005 (internet archive) pp. 1-2, www.therearealplaces.com/infgdes/money.atmnotif.htm.

AMD Announces Specification for Open Platform Management Architecture, Feb. 28, 2005, pp. 1-2, http://www.thefreelibrary.com/AMD+Announces+Specification+for+Open+Platform+Management+Architecture-aO129342307.

Bellvin and Merritt, "Augmented Encrypted Key Exchange: a Password-Based Protocol Secure Against Dictionary Attacks and Password File Compromise", Proceedings of the 1st ACM Conference on Computer and Communications Security, Nov. 1993.

Schneier, "Applied Cryptography: Protocols, Algorithms, and Source Code in C", 1996, John Wiley & Sons, Inc., Second Edition, pp. 455-456.

Zuccherato, Robert, Elliptic Curve Cryptography Support in Entrust, May 9, 2000.

Red Hat Certificate System, http://www.redhat.com/f/pdf/rhas/DirSecProductSheetCertificateSystem.pdf, Jun. 2005.

PKCS#11 v2.20: Cryptographic Token Interface Standard, RSA Laboratories, Jun. 28, 2004 (see, e.g. Chapter 10, Objects) (see www.rsasecurity.com, 407 pages).

Cryptographic Message Syntax, R. Housley, Request for Comments (RFC) 2630, Network Working Group, The Internet Society, Jun. 1999.

Balfanz (Dirk ABalfanz, "Access Control for Ad-Hoc Collaboration", Princeton University Jan. 2001).

Schneier, Bruce. Applied Cryptography, Second Edition. 1996 John Wiley and Sons, pp. 480-481.

* cited by examiner

TIME-BASED FUNCTION BACK-OFF

FIELD

This invention relates generally to certificates, more particularly, embodiments relate to methods, apparatus, and systems for secure electronic mail.

DESCRIPTION OF THE RELATED ART

Security is an on-going concern for computers from the single home user to enterprise systems. Cryptographic keys, passwords, smart cards, personal identification numbers and other similar security devices are often used to protect computing systems. Some systems require a user to change her password every three months or to enter a synchronized time-based code when entering.

For the users that enter passwords to log-in to their respective computing system, the user typically has a limited number of attempts to authenticate. The computing system may be configured to lock-out the user after the number of failed attempts exceeds the user-defined limit. Accordingly, the user may have to contact the security officer in the information technology department to verify the user, generate a new password and/or unlock the terminal.

Although these measures increase the overall security of the computing system, they often frustrate the user in the time and energy expended to resolve a locked out terminal. Accordingly, there is a need for a system that allows a user to exceed the failed password attempt limit while still maintaining the security level.

SUMMARY

An embodiment generally relates to a method of increasing user convenience. The method includes displaying a log-in user interface and receiving an authentication attempt in the log-in user interface. The method also includes determining a status of the authentication attempt and delaying a completion of the authentication attempt by a time-based function in response to a status being a failed authentication attempt.

Another embodiment pertains generally to a system for managing users. The system includes a server configured to provide application and data services to a plurality of users and at least one client configured to interface with the server. The system also includes a delay module configured to be executed by the at least one client. The delay module is configured to monitor a number of authentication attempts by a user of the at least one client and to delay a completion of the authentication attempt based on a time-based function and the number of authentication attempts.

Yet another embodiment relates generally to an apparatus for increasing user convenience. The apparatus includes a delay module adapted to interface with an existing log-in process executing on a computing platform and a counter configured to maintain a number of failed authentication attempts. The delay module is configured to monitor each log-in attempt and determine a status of each log-in attempt. The delay module is also configured to delay a completion of the authentication attempt by a time-based function in response to a status being a failed authentication attempt.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of secure computer systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments generally relate to a method and system for increasing convenience for a user. More particularly, a delay module may be implemented for a log-in process. The typical log-in procedure allows a limited number of chances for a user to correctly input his user name and password. After a number of unsuccessful attempts, the conventional log-in process typically locks out the user. The user then has to notify the security officer to reset his password and/or unlock his terminal, which is a great inconvenience. The delay module increases the satisfaction of the user experience by increasing the time between incorrect attempts based on a time-based function, i.e., a function that has resulting values that increase for each input. An example of a time-based function is an exponential function. The values for the time-based function can be selected such that a user may have short return times initially, mimicking current log-in procedures, and then increasing for subsequent attempts.

Figure 1:
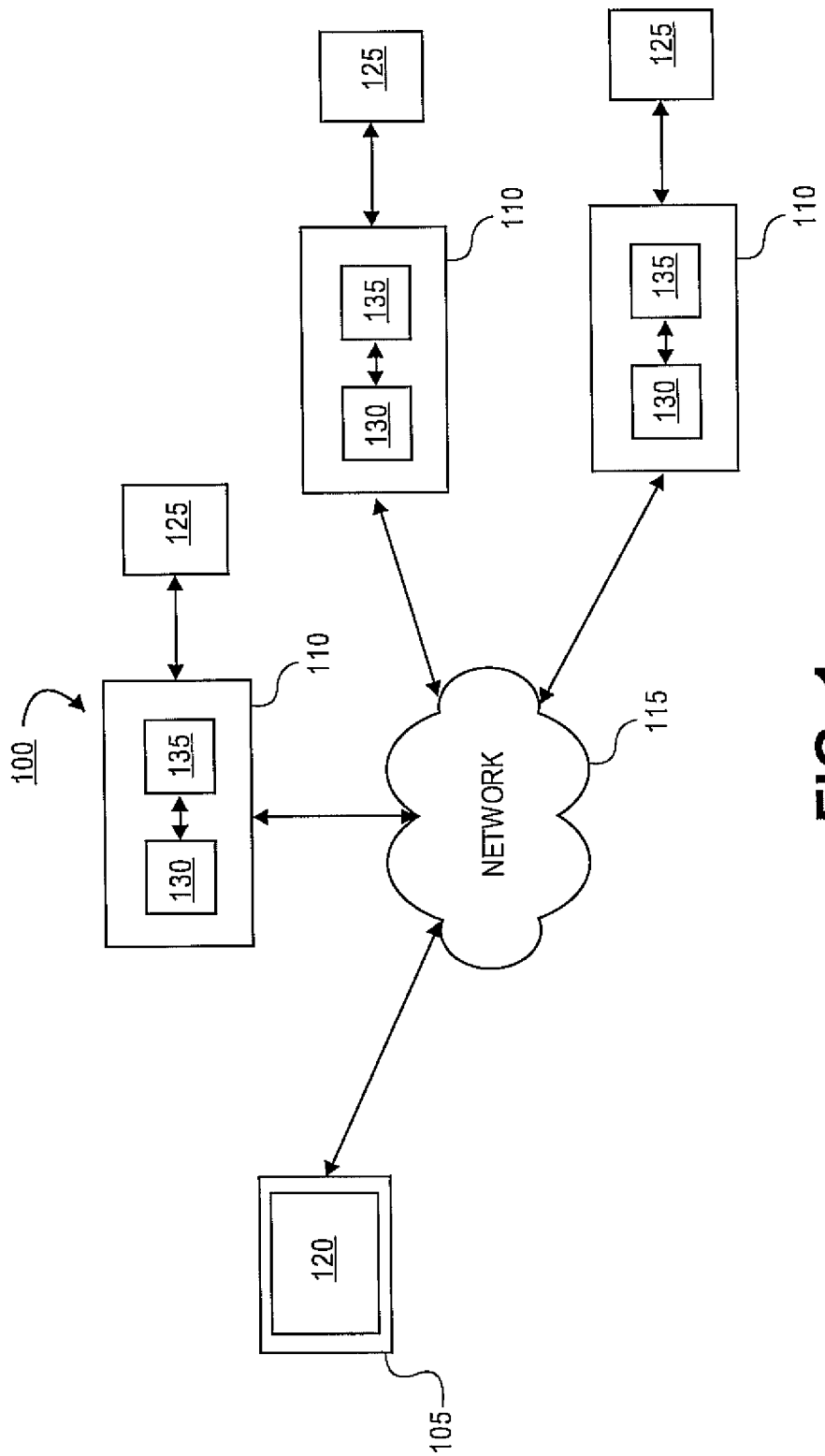
FIG. 1 illustrates an exemplary system in accordance with an embodiment.

FIG. 1 illustrates an exemplary secure system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the secure system 100 includes a server 105, clients 110 and a local network 115. The server 105 may be a computing machine or platform configured to execute a security management system 120 through a multiple user operating system (not shown) in conjunction with the clients 110. The server 105 may be implemented with server platforms as known to those skilled in the art from Intel, Advanced Micro Devices, Hewlett-Packard, etc.

The server 105 may interact with the clients over the local network 115. The local network 115 may be a local area network implementing an established network protocol such as Ethernet, token ring, FDDI, etc. The local network 115 provides a communication channel for the server 105 and clients 110 to exchange data and commands.

The clients 110 may be computing machine or platform configured to execute secure and open applications through the multi-user operating system. The clients 110 may be implemented with personal computers, workstations, thin clients, thick clients, mobile computing devices, or other similar computing platform. The clients 110 may use operating systems such as Linux, Windows, Macintosh or other available operating system.

Each client 110 may be configured to interface with a security device 125. The security device 125 may be configured to act as a gatekeeper to the client 110. More particularly, a user may use a security token, such as a smart card, to access the respective client 110. Each client 110 may have a security client 130 executing to monitor the security device 125.

The security client 130 may execute a delay module 135 as part of a log-in process. The delay module 135 may replace an existing log-in process or be used in conjunction with the existing log-in procedure. The delay module 135 may be configured to prompt the user for authentication information, e.g., a password. The delay module 135 may pass the authentication information to the security client 130 to verify the authentication information. If the authentication information is valid, the delay module 135 allows the security client 130 to continue logging-on the user as existing systems do. Otherwise, if the authentication information is invalid, the delay module 135 may calculate a delay value based on a time-based function and a current number of failed authentication attempts. The delay value is then used to delay the re-appearance of the log-in user interface requesting authentication information. Accordingly, a user may enter as many password attempts as long as he is willing to tolerate an increasing amount of time between attempts. The time-based function may have the characteristic of increasing resulting values, time delay, for each input, i.e., password attempts.

In some embodiments, the delay module 135 may maintain a counter of failed authentication attempts. This counter is reset when the user successfully logs-on, after a system administrator specified length of time between password attempts or by direct intervention of the system administrator.

Figure 2:
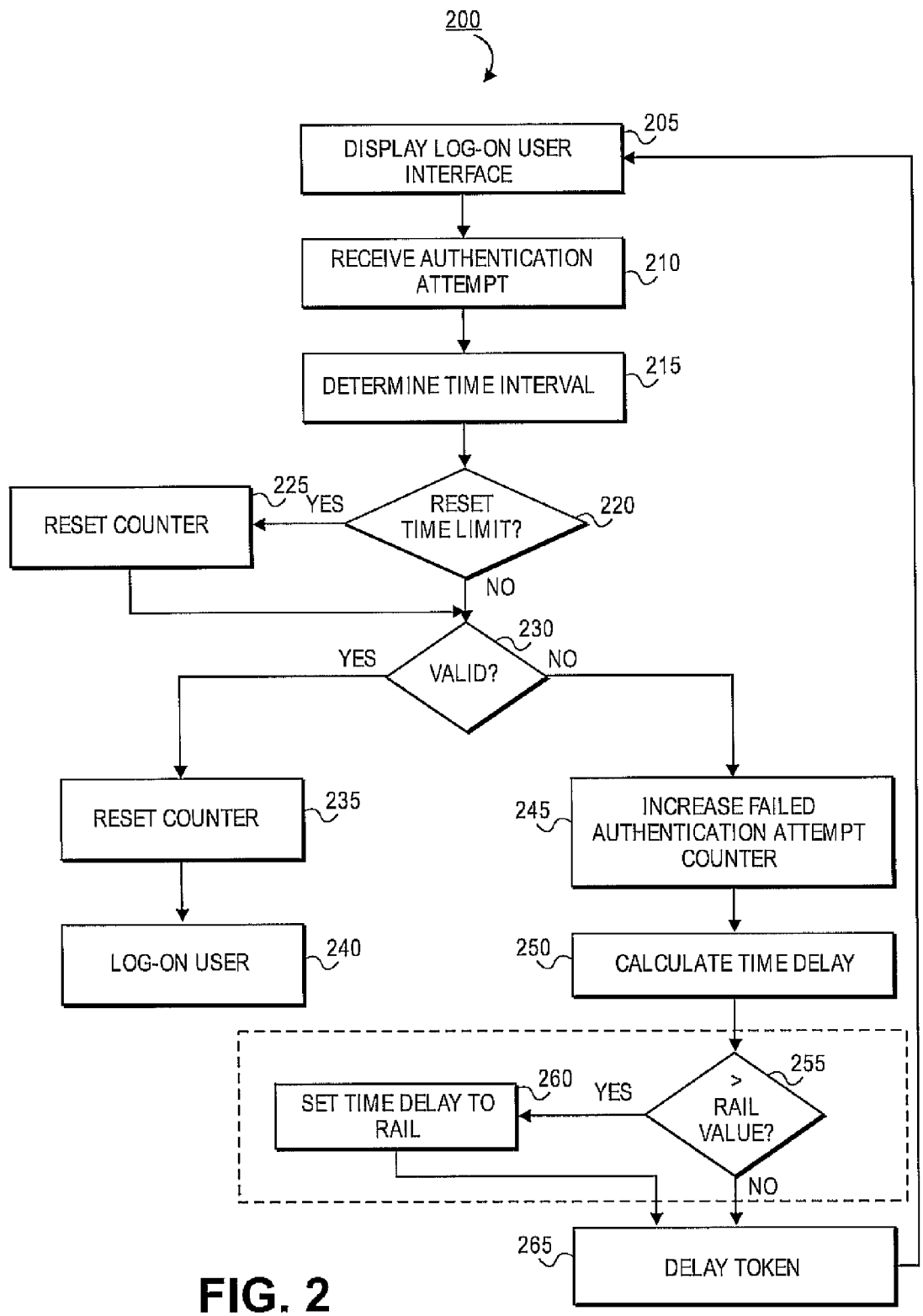
FIG. 2 illustrates an exemplary flow diagram in accordance with another embodiment.

FIG. 2 illustrates an exemplary flow diagram 200 executed by the delay module 135 in accordance with another embodiment. It should be readily apparent to those of ordinary skill in the art that the flow diagram 200 depicted in FIG. 2 represents a generalized schematic illustration and that other steps may be added or existing steps may be removed or modified.

As shown in FIG. 2, the delay module 135 may be configured to display a log-in user interface, in step 205. More particularly, the delay module 135 may be invoked as a process as part of the boot-up procedure for the client 110. In step 210, the delay module 135 may receive an authentication attempt on the log-in user interface. The delay module 135 may then transfer the authentication attempt to the security client 130 to validate the entered authentication information and store a log-in attempt time.

In step 215, the delay module 135 may determine a time interval value between the current attempt time and a previous authentication attempt, if any. The delay module 135 may be compare the time interval value with a reset time limit, in step 220. The reset time limit is a user defined value that allows a user to attempt a log-in as a first attempt. The reset time limit may be as short as a day or as long as a week. As such, if the delay module 135 determines time interval value is greater than the reset time limit, the delay module 135 may reset the failed authentication attempt counter, in step 225. Otherwise, the delay module 135 proceeds with the current value of the failed authentication attempts counter.

In step 230, the delay module 135 receives a status of the authentication attempt from the security client 130. If the authentication attempt is valid, the delay module 135 may reset the failed authentication attempts counter, in step 235. Subsequently, the delay module 135 may pass the user to the security client 130 to continue logging-in the user, in step 240.

Otherwise, if the authentication attempt failed, in step 230, the delay module 135 may be configured to increment by one the failed authentication attempts counter, in step 240. The delay module 135, in step 245, may calculate a time delay based on a time-based function, in step 250, The time-based function may be a variety of mathematical functions with the characteristic of increasing function values for each input value. One example is an exponential function.

For some embodiments, an exponential function may be selected such as $b^x$. Accordingly, a time delay value may be defined as equation 1:

$$\text{time delay} = ab^x \tag{1}$$

where the base value, b, may be a user-specified real number, exponent x may be set to the current value of the failed authentication attempts counter, and weighting factor, a, may be a user-specified real number to further refine the time delay.

In other embodiments, the time-based function is a linear function such as in equation 2:

$$\text{time delay} = abx \tag{2}$$

where the base value, b, may also be a user-specified real number, variable x may be to the current value of the failed authentication attempts counter, and weighting factor, a, may be a user-specified real number to refine the time delay.

After the calculation of the time delay, the delay module 135 may be configured to compare the calculated time delay with a rail value, in step 255. The rail value may be time limit to lock out the token as an added measure of security, where the rail value may be user-defined. If the time delay exceeds the rail value, the delay module 135 may set the time delay to the rail value. Subsequently, the delay module 135 may delay a subsequent attempt to communicate with the token by the rail value. Otherwise, if the calculated time delay is less than the rail value, the delay module 135 may delay a subsequent attempt to communicate with the token for the calculated time delay, in step 265. For some embodiments, the tokens may be configured to allow one log-in attempt at a time and will wait until that log-in attempt has completed before allowing the next attempt. Accordingly, the delay module 135 may be configured to add the calculated time delay to the wait time of the token in completing the log-in attempt.

Figure 3:
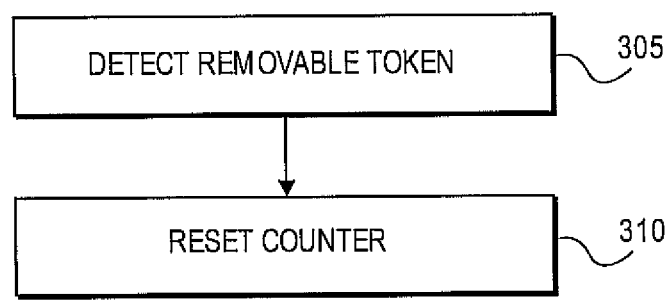
FIG. 3 illustrates another exemplary flow diagram in accordance with yet another embodiment.

In some embodiments, steps 255 and 260 may be omitted from the flow diagram 200 if the delay module 135 implements an additional flow diagram as depicted in FIG. 3. With reference to FIG. 3, the delay module 135 may detect the removal of the token, in step 305. The delay module 135, in step 305, may be configured to reset the failed authentication attempts counter.

Accordingly, a user may attempt to log-in the secure computer system without considering being locked-out. The user has to merely incur lengthy delays between later authentication attempts. Moreover, the security of the overall system is maintained because a hacker would only have a few attempts at entering the system before the time delay forces the hacker to move along.

Figure 4:
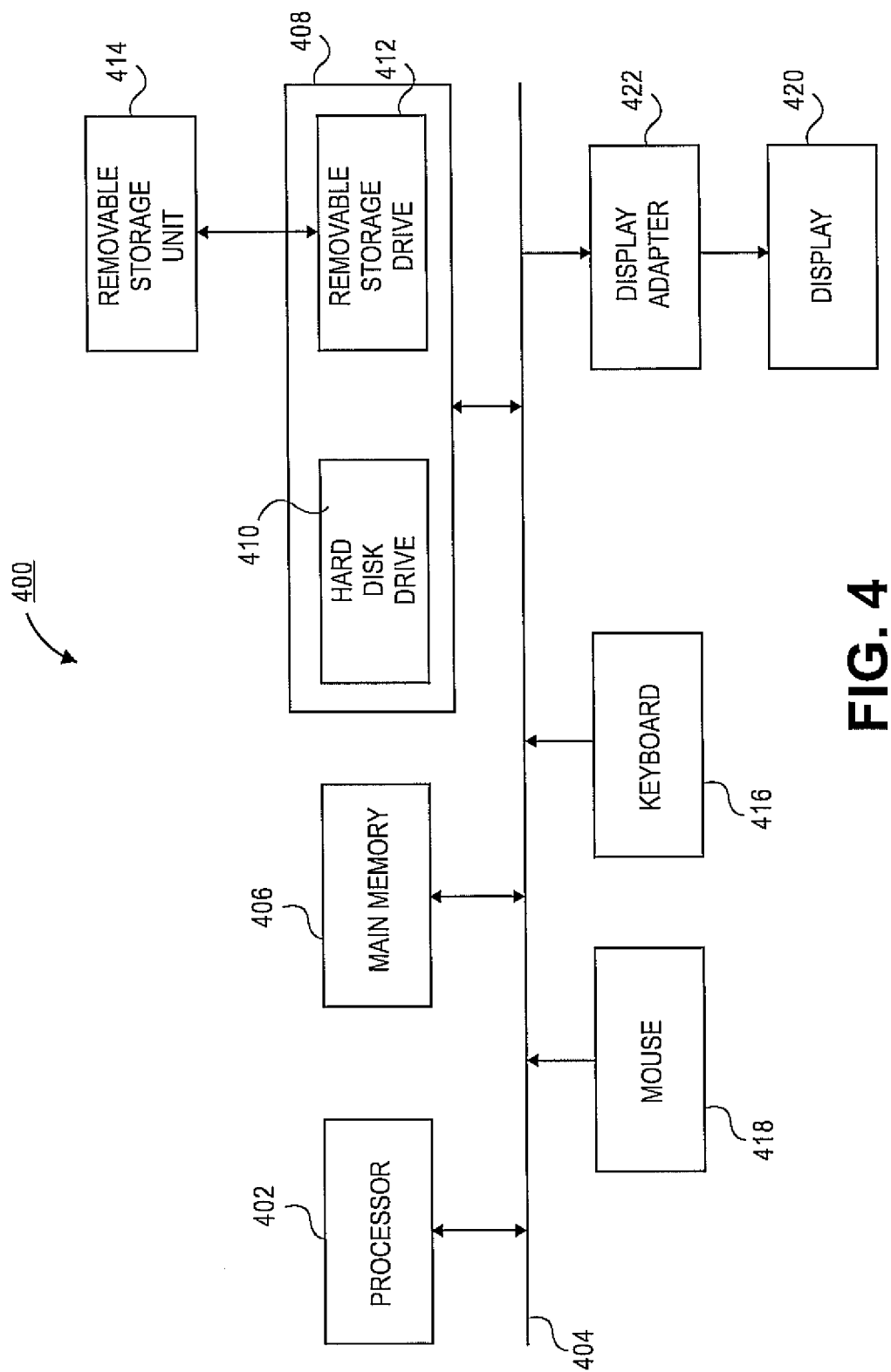
FIG. 4 illustrates an exemplary computing platform in accordance with yet another embodiment.

FIG. 4 illustrates an exemplary block diagram of a computing platform 400 where an embodiment may be practiced. The functions of the delay module may be implemented in program code and executed by the computing platform 400. The delay module may be implemented in computer languages such as PASCAL, C, C++, JAVA, etc.

As shown in FIG. 4, the computer system 400 includes one or more processors, such as processor 402 that provide an execution platform for embodiments of the delay module. Commands and data from the processor 402 are communicated over a communication bus 404. The computer system 400 also includes a main memory 406, such as a Random Access Memory (RAM), where the delay module may be executed during runtime, and a secondary memory 408. The secondary memory 408 includes, for example, a hard disk drive 410 and/or a removable storage drive 412, representing a floppy diskette drive, a magnetic tape drive, a compact disk drive, etc., where a copy of a computer program embodiment for the delay module may be stored. The removable storage drive 412 reads from and/or writes to a removable storage unit 414 in a well-known manner. A user interfaces with the delay module with a keyboard 416, a mouse 418, and a display 420. A display adapter 422 interfaces with the communication bus 404 and the display 420. The display adapter also receives display data from the processor 402 and converts the display data into display commands for the display 420.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
identifying a security token associated with a user;
receiving an authentication attempt in a log-in user interface at a client machine, the authentication attempt comprising a credential associated with the security token;
determining a time interval between the authentication attempt and a previous authentication attempt;
comparing the time interval to a reset time limit;
in response to the time interval being less than the reset time limit, maintaining, by the client machine, a number of authentication attempts in a counter;
determining that the authentication attempt has failed;
calculating, by a processing device of the client machine, using at least one of an exponential function or a linear function, a delay for accepting further authentication attempts associated with the security token in view of the number of authentication attempts;
determining whether the calculated delay exceeds a limit value;
reducing the calculated delay to the limit value in response to the calculated delay exceeding the limit value;
adding a wait time specified by the security token to the calculated delay to calculate a total delay for accepting further authentication attempts
detecting, by the client machine, a removal of the security token from the client machine; and
in response to the removal, resetting, by the client machine, the number of authentication attempts in the counter.

2. The method of claim 1, further comprising logging in a user in response to the authentication attempt succeeding.

3. The method of claim 1, further comprising calculating the delay in view of a time-based function, wherein the time-based function is an exponential function.

4. The method of claim 3, wherein the exponential function comprises a base value and a variable is a number of authentication attempts.

5. The method of claim 1, wherein calculating the delay comprises:
determining a number of authentication attempts; and
determining the delay in view of the base value and the number of authentication attempts.

6. The method of claim 1, further comprising:
in response to the time interval being greater than the reset time limit, resetting the number of authentication attempts in the counter.

7. A non-transitory machine-readable storage medium storing instructions which, when executed, cause a processing device to perform operations comprising:
identifying a security token associated with a user;
receiving an authentication attempt in a log-in user interface at a client machine, the authentication attempt comprising a credential associated with the security token;
determining a time interval between the authentication attempt and a previous authentication attempt;
comparing the time interval to a reset time limit;
in response to the time interval being less than the reset time limit, maintaining, by the processing device of the client machine, a number of authentication attempts in a counter;
determining by the processing device of the client machine that the authentication attempt has failed;
calculating, by the processing device of the client machine, using at least one of an exponential function or a linear function, a delay for accepting further authentication attempts associated with the security token in view of the number of authentication attempts;

determining whether the calculated delay exceeds a limit value;

reducing the calculated delay to the limit value in response to the calculated delay exceeding the limit value;

adding a wait time specified by the security token to the calculated delay to calculate a total delay for accepting further authentication attempts detecting, by the processing device of the client machine, a removal of the security token from the client machine; and in response to the removal, resetting, by the processing device of the client machine, the number of authentication attempts in the counter.

8. The non-transitory machine-readable storage medium of claim 7, wherein the operations further comprise:

in response to the time interval being greater than the reset time limit, resetting the number of authentication attempts in the counter.

9. A system comprising:

a server to provide application and data services to a plurality of users;

and at least one client comprising a processing device and a memory to store a delay module to interface with the server, wherein the delay module to:

identify a security token associated with a user of the plurality of users;

monitor a number of authentication attempts by the user for the at least one client, each of the authentication attempts comprising a credential associated with the security token;

determine a time interval between a current authentication attempt and a previous authentication attempt;

compare the time interval to a reset time limit;

in response to the time interval being less than the reset time limit, maintain the number of authentication attempts in a counter;

calculate, using at least one of an exponential function or a linear function, a delay for accepting further authentication attempts associated with the security token, wherein the delay is calculated in view of the number of authentication attempts;

determine whether the calculated delay exceeds a limit value;

reduce the calculated delay to the limit value in response to the calculated delay exceeding the limit value;

add a wait time specified by the security token to the calculated delay to calculate a total delay for accepting further authentication attempts detect a removal of the security token from the client machine; and in response to the removal, reset the number of authentication attempts in the counter.

10. The system of claim 9, wherein the delay module is further to determine whether an authentication attempt has failed.

11. The system of claim 10, wherein the delay module is further to increase the counter for a number of failed authentication attempts.

12. The system of claim 11, wherein the time-based function is a linear function in view of the base value multiplied by the counter for the number of failed authentication attempts.

13. The system of claim 9, further comprising calculating the delay by a time-based function, wherein the time-based function is a mathematical expression where an interval increases between successive values.

14. The system of claim 9, wherein the time-based function is an exponential function.

15. The system of claim 14, wherein the exponential function comprises the base value and a variable is the counter.

16. The system of claim 9, wherein the at least one client is further to log in to the server in response to a valid authentication attempt.

17. The system of claim 9, wherein the delay module is further to:

reset the number of authentication attempts in the counter in response to the time interval being greater than the reset time limit.

18. An apparatus, comprising:

a memory to store a delay module, to interface with an existing log-in process executing on a computing platform of a client machine, and a counter to maintain a number of failed authentication attempts; and a processing device, operatively coupled to the memory, the processing device to execute the delay module to:

identify a security token associated with a user;

determine a time interval between a current authentication attempt and a previous authentication attempt, the current authentication attempt and the previous authentication attempt each comprising a credential associated with the security token;

compare the time interval to a reset time limit;

in response to the time interval being less than the reset time limit, maintain the number of failed authentication attempts in the counter;

monitor each authentication attempt to determine whether the authentication attempt has failed;

calculate, using at least one of an exponential function or a linear function, a delay for further authentication attempts associated with the security token in view of the number of failed authentication attempts in response to the authentication having failed;

determine whether the calculated delay exceeds a limit value;

reduce the calculated delay to the limit value in response to the calculated delay exceeding the limit value;

adding a wait time specified by the security token to the calculated delay to calculate a total delay for accepting further authentication attempts detect a removal of the security token from the client machine; and in response to the removal, reset the number of authentication attempts in the counter.

19. The apparatus of claim 18, further comprising a counter to monitor a number of failed authentication attempts during a log-in procedure.

20. The apparatus of claim 19, wherein the delay module is further to calculate the delay in view of the counter.

21. The apparatus of claim 18, wherein the delay module is further to calculate the delay by a time-based function, wherein the time-based function is a mathematical expression where an interval increases between successive values.

22. The apparatus of claim 21, wherein the time-based function is an exponential function.

23. The apparatus of claim 21, wherein the time-based function is a linear function.

24. The apparatus of claim 18, wherein the delay module resets after a user-specified length of time and no authentication attempts have occurred during the user-specified length of time.

25. The apparatus of claim 18, wherein the delay module resets after a successful authentication attempt.

26. The apparatus of claim 18, wherein the delay module is further to:

reset the number of failed authentication attempts in the counter in response to the time interval being greater than the reset time limit.

\* \* \* \* \*